United States Patent [19]

Chaya et al.

[11] Patent Number: 5,161,146
[45] Date of Patent: Nov. 3, 1992

[54] DISC CLEANING DEVICE

[75] Inventors: Masahiko Chaya, Yokohama; Naoki Imokawa, Tokyo, both of Japan

[73] Assignee: Canon Kabushiki Kaisha, Tokyo, Japan

[21] Appl. No.: 498,633

[22] Filed: Mar. 26, 1990

[30] Foreign Application Priority Data

Mar. 30, 1989 [JP] Japan ................................. 1-76587

[51] Int. Cl.⁵ ............................................. G11B 3/58
[52] U.S. Cl. ................................. 369/72; 15/DIG. 4
[58] Field of Search ................... 369/71, 72, 73, 74, 369/292; 360/97.02; 15/DIG. 4

[56] References Cited

U.S. PATENT DOCUMENTS 4,947,029  8/1990  Kurihara et al. ................... 235/475

FOREIGN PATENT DOCUMENTS

| | | | |
|---|---|---|---|
| 0057007 | 3/1986 | Japan | 369/72 |
| 0177636 | 8/1986 | Japan | 369/72 |
| 0248276 | 11/1986 | Japan | 369/72 |
| 0046278 | 2/1989 | Japan | 369/72 |
| 0137487 | 5/1989 | Japan | 369/72 |
| 0220281 | 9/1990 | Japan | 369/72 |
| 0254692 | 10/1990 | Japan | 369/72 |
| 0304787 | 12/1990 | Japan | 369/74 |
| 0012088 | 1/1991 | Japan | 369/74 |

*Primary Examiner*—John W. Shepperd
*Assistant Examiner*—Tan Nguyen
*Attorney, Agent, or Firm*—Fitzpatrick, Cella, Harper & Scinto

[57] ABSTRACT

A disc cleaning device for cleaning the surface of a disc-type recording medium comprises a belt type cleaning device which is adapted to be operated in the radial direction of the recording medium so as to clean the surface of the recording medium and a pressurizing device which presses the cleaning member against the surface of the recording medium at a region to be cleaned while keeping a cleaning surface of the cleaning device in contact with the surface of the recording medium.

9 Claims, 4 Drawing Sheets

DISC CLEANING DEVICE

BACKGROUND OF THE INVENTION

1. Field of the Invention

The present invention relates to a cleaning device for cleaning a surface of a disc type recording medium on which information is recorded and/or reproduced by the use of laser beam.

2. Related Background Art

Various recording media have been used for an information recording/reproducing apparatus in which information is recorded or reproduced on the recording media by using a laser beam. In such recording media, for example, there are recording media such as compact discs, video discs, CD-ROM or the like only for information reproduction, such recording media on which information can be additionally recorded according to the phase change of a metal, the shape of a pit or the like, and such recording media on which information can be re-written by thermal magnetic (optical magnetic) or organic materials. These practical recording media have been protected by providing a plastic layer or glass substrate having a thickness of about 1 to 1.5 mm on the recording layer. However, there has been posed such a problem that when a dust or the like sticks to the surface of the recording medium so as to dirty the surface of the medium, the incidence of laser beam is caused to be blocked, and as a result the recording or reproduction is degraded. Therefore, it is necessary to regularly clean the surfaces of the recording media upon which laser beams are incident, and so various cleaning devices have been proposed.

Now, an example of conventionally proposed cleaning devices will be illustrated with reference to FIG. 7. In FIG. 7, numeral 81 denotes a cleaning member, numeral 82 denotes a recording region, numeral 83 denotes a disc type recording medium, and numeral 84 denotes the radial width of the recording region. In this structure, cleaning is carried out by the rotation of the cleaning member 81, having a ring shape with an inner diameter greater than the recording regional width (84) of the disc type recording medium (83), in the direction of arrow. At this time, it is effected so that the frictional direction is as perpendicular as possible to the circular direction. That is, the frictional direction is directed toward the radial direction of the recording medium. This is because the formation of flaws not less than a medium negatively influences the recording/reproducing.

However, it is difficult to apply in practice the above structure as a cleaning device in view of the cartridge structure of the recording medium (Recording media have been conventionally placed in each cartridge case to protect it from dust). This cartridge case has a small window which opens on recording, reproducing or erasing information to expose a part of the recording medium to the outside. Because the size of the small window on the cartridge case is limited, it is not easily convenient to clean the surface of the recording medium through that small window.

SUMMARY OF THE INVENTION

One object of the present invention is, in view of the above circumstance, to provide a disc cleaning device wherein a cleaning member is equipped so as to move in the radial direction of a disc type recording medium corresponding to the window of a cartridge, whereby flaws to information in the circular direction of the disc, which is unfavorable for recording/playback, can be prevented, and cleaning is carried out by keeping an appropriate contact pressure against the disc surface.

Another object of the present invention is to provide an optical information recording/reproducing apparatus having such a disc cleaning device.

According to the present invention, the above objects can be achieved by a disc cleaning device which comprises a belt-like cleaning member which is adapted to be operated in a radial direction of the disc-like recording medium so as to clean the surface of the recording medium, and a pressurizing member which presses the cleaning member against the surface of the recording medium at a region to be moved upon such a state that the cleaning surface of the cleaning member is kept in contact with the disc surface. And the above object is accomplished by providing an optical information recording/reproducing apparatus for recording and/or reproducing information and or erasing information on a disc-like recording medium by the use of a laser beam, which includes a belt-like cleaning device which is adapted to be operated in a radial direction of the disc-like recording medium so as to clean the surface of the recording medium and a pressurizing member which presses the cleaning member against the surface of the recording medium at a region to be moved while keeping the cleaning surface of the cleaning member in contact with the disc surface.

The present invention will be illustrated in detail with reference to the examples hereinafter described.

DESCRIPTION OF THE PREFERRED EMBODIMENT

Figure 1A:
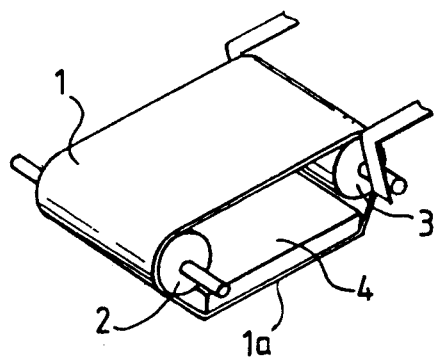
FIG. 1A is a perspective view showing the outline of the cleaning device of the first example according to the present invention.
Figure 1B:
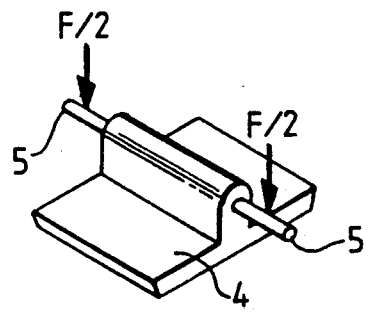
FIG. 1B is a view showing in detail the pressurizing member 4 of the cleaning device as shown in FIG. 1A.
Figure 2:
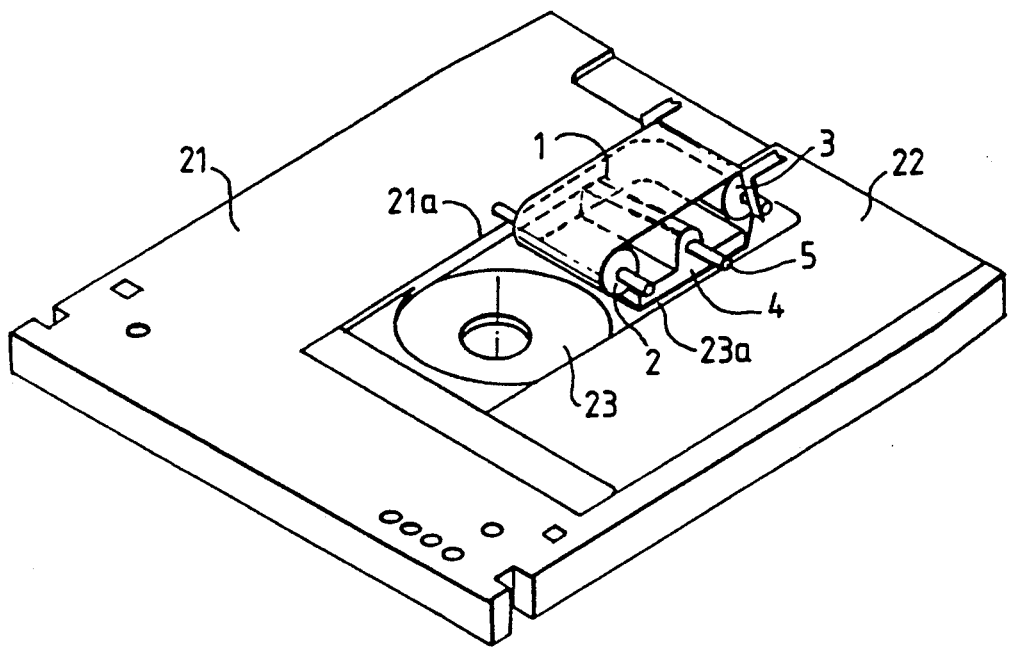
FIG. 2 is a view showing the positional relation of the cleaning device as shown in FIG. 1A to the recording medium upon cleaning.

The first example of the present invention will now be described concretely with reference to FIGS. 1A, 1B and 2. FIG. 1A shows the outline of the cleaning device of the first example according to the present invention In this case, cleaning member (1) is an endless belt and is tightly supported by paired rollers which are a belt driving roller (2) and a driven roller (3).

As for the material of the cleaning member, porous urethane foam, etc. is preferred.

The plane (1a) in contact with the recording medium, which is a part of the cleaning member 1, is pressed from its back side by the plate-like pressurizing member (4), on which pressure F is exerted by a suitable means such as a plate spring or the like. Though pressure F may be considered to be exerted equally upon the full plane of the pressurizing member 4, in this example, pressure F is exerted upon a pivot 5 supporting the pressurizing member 4 as shown in FIG. 1B. The cleaning device having such the structure is placed so as to abut against a cartridge loading type opto-magnetic recording medium 23, as shown in FIG. 2. In this case, as the shutter 22 of a cartridge 21 is opened, a portion of the recording medium 23 is exposed to the outside through a window 21a, at which the cleaning member 1 of the cleaning device comes into contact with the recording medium 23.

Since the size of the contact plane 1a of the cleaning member 1 may be designed more freely, compared with conventional structures, if the design for the contact surface 1a of the cleaning member 1 is done by considering the window 21a, the surface of the recording medium 23 inside the cartridge can be cleaned through the window 21a.

Next, when the cleaning member 1 is driven by the belt driving roller 2, to which a drive source (not shown in the Figure) conducts a drive force, the surface in contact with the recording medium moves in the radial direction of the recording medium to clean, while the pressurizing member 4 keeps the cleaning member in contact pressure against the recording medium 23 to.

Figure 3A:
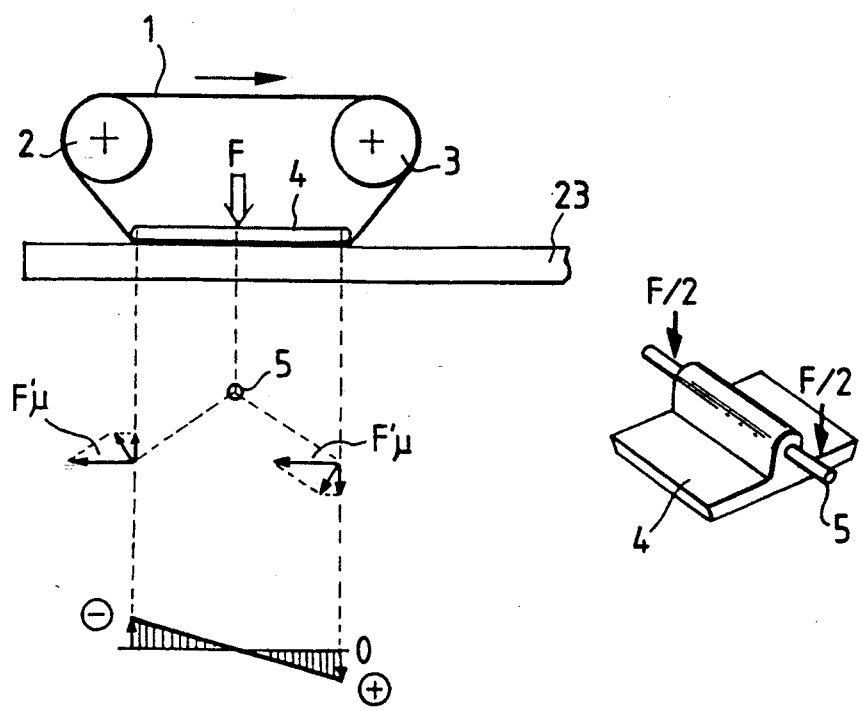
FIGS. 3A and 3B are views showing the contact pressure of the cleaning device by its dependence on the pressurizing member.
Figure 3B:
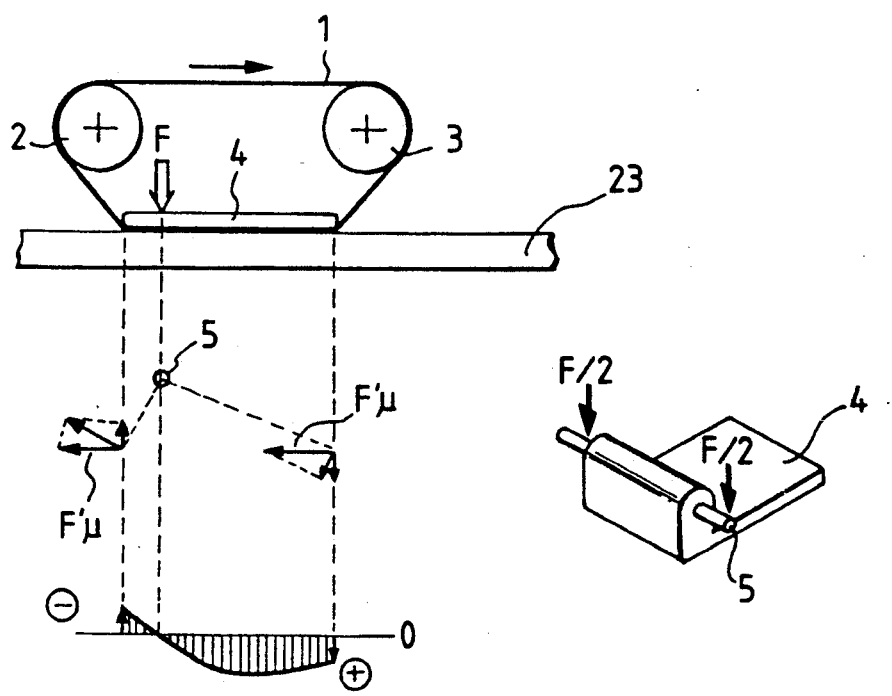

FIG. 3 is an analytic view showing the distribution of the contact pressure on the cleaning member 1 by the pressurizing member 4. If the pressurizing member 4 having the structure as shown in FIG. 1B is used, the pressurizing force per unit area is $Fa' = F/A$ (A is a contact area). But, in view of the resultant force of the friction force of the cleaning member 1, the distribution of the pressurizing force on the recording medium 23 is as shown in FIG. 3A. So, for example, as shown in FIG. 3B, if a pivot 5 is placed near the cleaning end side of the cleaning member 1, that is, near the cleaning end side in the longitudinal direction of the pressurizing member 4, preferably, not more than one-fourth of the way from the cleaning end side in the longitudinal direction of the pressurizing member 4 through the pivot 5, the distribution of the pressurizing force is uniform.

Thus, the manner for exerting the pressurizing force may be designed by considering the friction force, which is effective for uniform cleaning.

Figure 4:
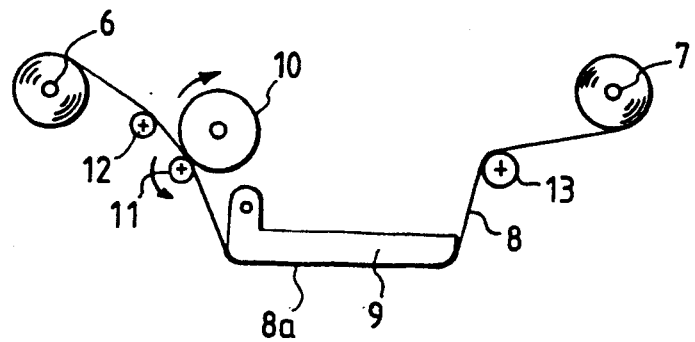
FIG. 4 is a side view showing the cleaning device of the second example according to the present invention.

Also, in the above first example, an endless belt is used as a cleaning member, but, as shown in FIG. 4, such a construction may be applied that a long belt is set between rewinding reel 6 and a supply reel 7 so that the belt is caused to come in contact with the surface of the recording medium at its intermediate contact surface to the disc by pressurizing member 9 in the step for reeling up the belt from one reel to the other. In the latter, it is necessary to set a driving roller 10 (its drive source is not shown in the Figure), a pinch roller 11, guide rollers 12 and 13 for effecting the support and the traction of the belt interposed therebetween. The belt driving roller 2 and the driven roller 3, or the reels 6 and 7 are removable so that the cleaning member can be exchanged.

Now, an optical information recording/reproducing apparatus such as a magneto-optical information recording/reproducing apparatus having a cleaning device according to the present invention will be illustrated with reference to FIG. 5.

Figure 5:
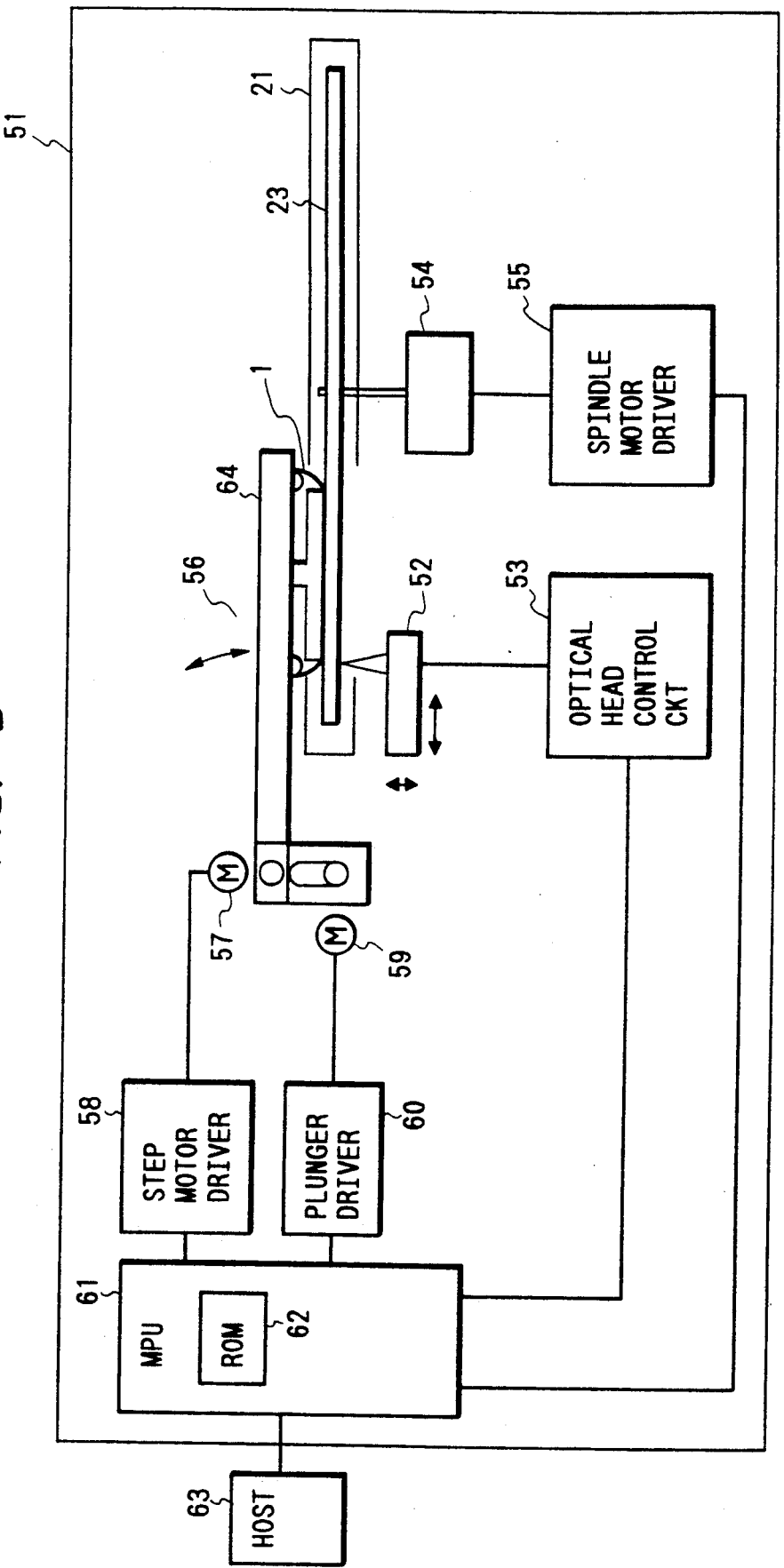
FIG. 5 is a block diagram showing an optical information recording/reproducing apparatus incorporating such a cleaning device according to the present invention.

In FIG. 5, the components having the same numbers as in the above Figures show the same members as above. Numeral 51 denotes an optical information recording/reproducing apparatus; numeral 52 denotes an optical head having a laser source (not shown in the Figure) which emits a laser beam for recording and/or reproduction of information, optical parts (not shown in the Figure) such as an objective lens for converging the laser beam on a recording medium, and a detector (not shown in Figure) for detecting reflected light from the recording medium. Numeral 53 denotes an optical head control circuit which controls the shift of the optical head 52 on seeking the focusing and tracking of the laser beam to the recording medium, the modulation of information on recording/reproduction, and the driving of the laser source. Numeral 54 denotes a spindle motor which rotates the recording medium 23 upon recording, reproducing and cleaning; numeral 55 denotes a spindle motor driver which controls the spindle motor 54; numeral 56 denotes a cleaning system including the cleaning device according to the present invention; and numeral 57 denotes a stepping motor for driving the cleaning member 1 of the cleaning device in the cleaning system 56. Numeral 58 is a step motor driver for controlling the step motor 57; numeral 59 denotes a plunger motor for causing a load arm of the cleaning device in the cleaning system 56 to go up and down; numeral 60 denotes a plunger driver for controlling the plunger motor 59; and numeral 61 denotes a MPU (Micro Processor Unit) which controls the optical head control circuit 53, spindle motor driver 55, step motor driver 58 and plunger motor driver 601. Numeral 62 denotes a ROM (Read Only Memory) built in MPU 61; and numeral 63 denotes an external host computer which generally controls the optical information recording/reproducing apparatus through MPU 61.

Figure 6:
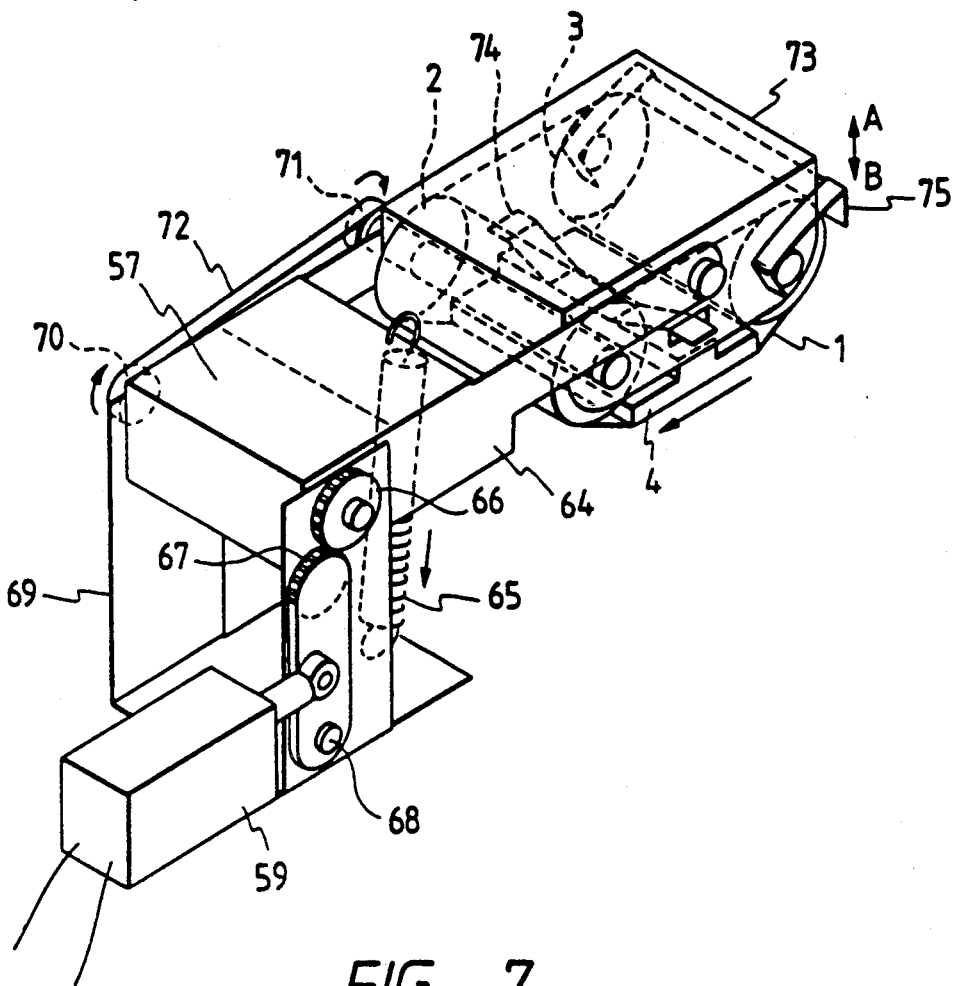
FIG. 6 is a view showing in detail the cleaning system as shown in FIG. 5.
Figure 7:
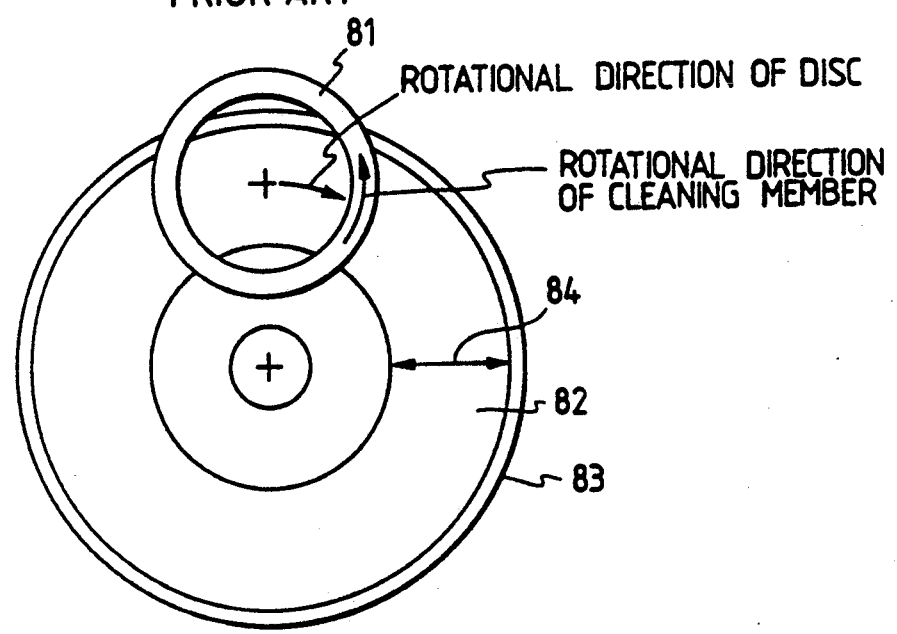
FIG. 7 is a view illustrating the structure of a conventionally proposed cleaning device.

Also, the cleaning system 56 is shown in detail in FIG. 6.

In FIG. 6, the components having the same numbers as in the above Figures are the same as above. In FIG. 6, numeral 64 denotes a load arm which transports the cleaning device (composed of numbers 1, 2, 3 and 4) between the cleaning position and the non-cleaning position; numeral 65 denotes a load spring which pulls the load arm 64 in one direction (the direction of cleaning position); numeral 66 denotes a gear integral with the load arm 64; numeral 67 denotes a fixed gear which engages with the gear 66; and numeral 68 denotes a rotation axis of the fixed gear 67. The functions of these components will now be illustrated. When the plunger motor 59 causes the fixed gear 67 to rotate in an urging direction about the rotational axis of the fixed gear, the fixed gear 67 of the load arm 64 is moved in the direction "A" (the direction of non-cleaning position), by cooperating with the gear 66. When the plunger motor 59 is driven in the reverse direction (pulling or disengaging direction), the load arm 64 moves in the direction "B" (the direction of cleaning position) by the force of the load spring 65.

The structure in FIG. 6 will be further illustrated. Arm holder 69 supports the load arm 64, the load spring 65 and fixed gear 67; numeral 70 denotes a pulley; numeral 71 denotes a driven pulley; numeral 72 denotes a belt which transfers the drive force of the driving pulley to the driven pulley; numeral 73 denotes a cleaner holder; numeral 74 denotes a plate spring which urges the pressurizing member 4; and numeral 75 denotes a tension control regulator for controlling the tensional condition on the cleaning member 1.

Next, the cleaning mechanism in the configuration shown in FIGS. 5 and 6 described above will be illustrated.

On recording or reproducing, the reflected light from the medium is detected by the optical head. The detection result is used for the focusing and tracking of the laser beam or as a reproducing RF signal, while it undergoes an arithmetic process in MPU 61, and is monitored whether the level is more or less than a predetermined level stored in ROM 62. If the detection result is not more than the predetermined level, MPU 61 discriminates such that the surface of the recording medium is dirty and send the signal to the host computer 63. Then the host computer 63 having received the signal instructs an indication for cleaning the recording medium by a display or an alarm to a user. The user, according to this information, ejects the cartridge 21 from the optical information recording/reproducing apparatus and inverts it (turns it over) and after that puts it into the apparatus again and then inputs the command for starting up the cleaning to the host computer 63. The host computer 63 instructs MPU 61 to start up the cleaning according to this command. MPU 61 having received the instruction controls the plunger driver 60 to drive the plunger motor 59 to move the load arm 64 from the non-cleaning position to the cleaning position (The load arm 64 is positioned away from the cartridge 21 on non-cleaning.) When the load arm 64 is set in the cleaning position, the cleaning member 1 is pressed (makes contact) against the surface of the recording medium 23 at a predetermined pressurizing force by the pressurizing member 4. Then, the spindle motor 54 is driven through the spindle motor driver 55 to rotate the recording medium 23 rotates inside the cartridge. At the same time, when the stepping motor 57 is driven through the stepping motor driver 58 to rotate the driving roller, the cleaning member (in this case, an endless belt) moves along the surface of the recording medium 23. After cleaning for a predetermined period, MPU 61 stops the drive of the step motor 57 to complete the cleaning operation and simultaneously drives the plunger motor (59) through the plunger motor driver 60 to move the load arm 64 backwards (to non-cleaning position). Also, at the same time, the signal of the completion of cleaning is sent to the host computer 63. The host computer 63 having received the signal indicate the information of the completion of cleaning to the user by a display or an alarm and thus all functions for cleaning are completed.

In this example, cleaning is carried out partly by the user's hands. However, it may be also constructed so that the optical head moves backwards (to a shunting position) on cleaning and the cleaning device can work in the side where the optical head is set, so as to carry out the cleaning of the recording medium 23. By such the construction, all the cleaning functions can be automatically done without any manual operation since it is not necessary to invert the cartridge 21.

What is claimed is:

1. A cleaning device for cleaning a disc-like recording medium, comprising:
    a belt-like cleaning member which operates to run in a radial direction to the rotating dick-like recording medium so as to clean the surface of the recording medium; and
    a pressurizing member for pressing a cleaning surface of said cleaning member against the surface of the recording medium, wherein said pressurizing member comprises;
    a plate-like member adapted to come into contact with an inside surface of said cleaning surface of said cleaning member;
    a pivot member for pivotably supporting said plate-like member in a running direction of said cleaning member; and
    urging means for urging said pivot member so that said plate-like member presses said cleaning member against the recording medium.

2. A disc cleaning device according got claim 1, wherein said cleaning member is an endless belt.

3. A disc cleaning device according to claim 1, wherein said cleaning member includes a supply reel, a rewinding reel and a belt supported therebetween.

4. A disc cleaning device according to claim 1, wherein said cleaning member is porous urethane foam.

5. A cleaning device for cleaning a disc-like medium rotatably supported n an optical information cording/reproducing apparatus for effecting the recording and/or reproduction of information on the disc-like recording medium by use of a laser beam, comprising:
    a belt-like cleaning member which operates to run in a radial direction to the rotating disc-like recording medium so as to clean the surface of the recording medium; and
    a pressurizing member for pressing a cleaning surface of said cleaning member against the surface of the recording medium, wherein said pressurizing member comprises;
    a plate-like member adapted to come into contact with an inside surface of said cleaning surface of said cleaning member;
    a pivot member for pivotably supporting said plate-like member in a running direction of said cleaning member; and
    urging means or urging said pivot member so that said plate-like member presses said cleaning member against the recording medium.

6. A cleaning device according to claim 5, wherein said cleaning member is an endless belt.

7. A cleaning device according to claim 5, wherein said cleaning member includes a supply reel, a rewinding reel and a belt supported therebetween.

8. A cleaning device according to claim 5, wherein said cleaning member is porous urethane foam.

9. A cleaning device according to claim 5, further comprising an arm member for supporting said cleaning member, and wherein said arm member moves said cleaning member from a cleaning position to a non-cleaning position when not in use.

* * * * *

UNITED STATES PATENT AND TRADEMARK OFFICE
CERTIFICATE OF CORRECTION

PATENT NO. : 5,161,146
DATED : November 3, 1992
INVENTOR(S) : Masahiko Chaya, et al.

It is certified that error appears in the above-identified patent and that said Letters Patent is hereby corrected as shown below:

On the title page:
[30] FOREIGN APPLICATION PRIORITY DATA:

Insert --Mar. 16, 1990 [JP] Japan ............... 2-64307--.

COLUMN 1:

Line 48, "than a" should read --than a certain length in the circular direction of the recording--.

COLUMN 4:

Line 34, "601." should read --60.--.

COLUMN 6:

Line 11, "comprises;" should read --includes;--.

Line 21, "got" should read --to--.
Line 29, "n an" should read --in an-- and "cording-" should read --recording--.
Line 40, "comprises;" should read --includes;--.
Line 41, "adapted to come" should read --which comes--.

UNITED STATES PATENT AND TRADEMARK OFFICE
CERTIFICATE OF CORRECTION

PATENT NO. : 5,161,146

DATED : November 3, 1992

INVENTOR(S) : Masahiko Chaya, et al

It is certified that error appears in the above-indentified patent and that said Letters Patent is hereby corrected as shown below:

Column 6:

Line 47, "or" should read --for--.

Signed and Sealed this

Twenty-fifth Day of January, 1994

Attest:

BRUCE LEHMAN

*Attesting Officer*     *Commissioner of Patents and Trademarks*